(12) United States Patent
Tokuda et al.

(10) Patent No.: US 6,654,740 B2
(45) Date of Patent: Nov. 25, 2003

(54) PROBABILISTIC INFORMATION RETRIEVAL BASED ON DIFFERENTIAL LATENT SEMANTIC SPACE

(75) Inventors: Naoyuki Tokuda, Tokyo (JP); Liang Chen, Tokyo (JP); Hiroyuki Sasai, Tokyo (JP)

(73) Assignee: SunFlare Co., Ltd., Tokyo (JP)

( * ) Notice: Subject to any disclaimer, the term of this patent is extended or adjusted under 35 U.S.C. 154(b) by 358 days.

(21) Appl. No.: 09/849,986

(22) Filed: May 8, 2001

(65) Prior Publication Data

US 2003/0050921 A1 Mar. 13, 2003

(51) Int. Cl.[7] .............................................. G06F 17/30
(52) U.S. Cl. .................................. 707/5; 707/6; 704/9
(58) Field of Search ................................ 707/3, 4, 5, 6, 707/10; 709/9

(56) References Cited

U.S. PATENT DOCUMENTS

| | | | |
|---|---|---|---|
| 4,839,853 A | | 6/1989 | Deerwester et al. ............ 707/5 |
| 5,301,109 A | * | 4/1994 | Landauer et al. ............... 704/9 |
| 6,332,138 B1 | * | 12/2001 | Hull et al. ....................... 707/5 |
| 6,510,406 B1 | * | 1/2003 | Marchisio ........................ 704/9 |
| 6,523,026 B1 | * | 2/2003 | Gillis ............................... 707/3 |

OTHER PUBLICATIONS

Schetze, H. "Dimensions of Meaning," Supercomputing '92, Proceedings 11–1992, PP. 787–796.*

Numerical Recipes in Fortran, The Art of Scientific Computing Second Edition, by Press, Flannery, Teukolsky and Vetterling (Cambridge University Press: Cambridge, England 1986).

* cited by examiner

Primary Examiner—Jack M. Chouless
(74) Attorney, Agent, or Firm—Jacobson Holman PLLC

(57) ABSTRACT

A computer-based information search and retrieval system and method for retrieving textual digital objects that makes full use of the projections of the documents onto both the reduced document space characterized by the singular value decomposition-based latent semantic structure and its orthogonal space. The resulting system and method has increased robustness, improving the instability of the traditional keyword search engine due to synonymy and/or polysemy of a natural language, and therefore is particularly suitable for web document searching over a distributed computer network such as the Internet.

11 Claims, 1 Drawing Sheet

PROBABILISTIC INFORMATION RETRIEVAL BASED ON DIFFERENTIAL LATENT SEMANTIC SPACE

BACKGROUND OF THE INVENTION

1. Field of the Invention

This invention relates to a computer-based information retrieval and search engine to retrieve textual digital objects.

2. Description of the Related Art

With the explosive usage of the Internet, an efficient information retrieval system plays a most important role in processing with efficiency an ever increasing volume of digital textual objects such as web pages and documents. Many search engines based on the traditional query system of natural language processing are not robust enough because a considerable number of different words may often be used to describe the same meaning (synonymy), and more often than not the same word can be associated with different meanings (polysemy) so that traditional keywords-based retrieval systems are not robust, often missing related materials while recalling unrelated ones.

The principle of Latent Semantic Structure with truncated Singular Vector Decomposition (SVD) was introduced, as summarized in U.S. Pat. No. 4,839,853, so as to automatically construct a unified semantic space for retrieval. The truncated SVD is capable of capturing most of the important underlying structure in associating terms with documents, while at the same time removing the noise or possible variability in word usage which consistently plagues the word-based retrieval system. Each query from a user is projected onto a document fact space, and the collected documents having the closest projection to the query in the document fact space are selected for retrieval.

The basic postulate is that there is an underlying latent semantic structure in word usage data that is capable of capturing partially hidden or obscured aspects of the terms due to the variability of word choice inherent to the ambiguity of natural language.

SUMMARY OF THE INVENTION

In view of the foregoing, one object of the present invention is an information retrieval system having improved robustness in handling synonymy and polysemy.

Another object of the invention is an information retrieval system with improved search capabilities through reliance on differential latent document space and the exploitation of the differences between the two normalized document vectors of the documents.

A further object of the present invention is an information retrieval system capable of capturing an underlying latent semantic structure through a projection of the differences in word usage between two documents onto the differential latent semantic space.

The invention relates to an advanced information retrieval system of textual digital objects whereby full use is made of the projection of documents onto both of the reduced document space endowed with the singular value decomposition-based latent semantic structure and its orthogonal space. The new information retrieval and search engine system developed has an improved performance with textual digital objects for an immediate application in web document search over the Internet.

Rather than to directly compare the latent semantic vectors of documents and a query, which are actually their projections onto the LSI space, the advanced concept of differential latent document space is introduced into the present analysis, where differences between the two normalized document vectors of the documents are extensively exploited.

The basic postulate is that a projection onto the differential latent semantic space of the differences of word usage between the two documents is capable of capturing an underlying latent semantic structure.

Given a document, a document vector may be directly set up according to the terms of the document. Yet, there may be other document vectors that can just as well describe the document. For example, given a summarization method, a summary of a document could set up for the document, while a document vector of the summary could also be regarded as the document vector of the document. According to the present invention, there may be several representations of document vectors and each document is not constrained to being represented by one document vector only.

Because of the normalization of each document vector of the documents, the cosine measurement between a pair of document vectors may be measured by the length of differential document vector of the pair of documents.

A so-called interior differential covariant term-document matrix is set up where the columns of the matrix represent the differential document vectors of the same documents. Exploiting the singular vector decomposition method as set forth in *Numerical Recipes*, by Press, Flannery, Teukolsky and Vetterling (Cambridge University Press: Cambridge, England, 1986), the major left singular vectors associated with the largest singular values are selected as a major vector space, being called an interior differential latent semantic space, which is used to roughly describe the interior differential document vectors. Given a query to be regarded as a quasi-document, a best candidate document to be recalled from the documents should be selected from among those having a closest differential document vector of the query to the interior differential latent semantic space.

A so-called exterior differential covariant term-document matrix is set up where the columns of the matrix are differential document vectors of the different documents. Exploiting the singular vector decomposition method, the major left singular vectors associated with the largest singular values are selected as a major vector space, being called an exterior differential latent semantic space, which is used to roughly describe the exterior differential document vectors. Given a query to be regarded as a quasi-document, a best candidate document to be recalled from the documents should be selected from among those having a closest differential document vector of the query to the exterior differential latent semantic space.

Exploiting the concept of the interior and exterior differential term-document matrices, the present invention sets up a posteriori function based on the form of most likelihood functions as a possible measure of reliability in retrieving a document in the database by a query.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Differential Term-Document Matrix

For the purposes of this document, the word "term" is defined as a word or a phrase that appears in at least two documents. So-called stop words, which are most frequently used in any topic, such as "a" and "the" in English, are excluded.

The restriction of a term to a word or phrase that appears in at least two documents is added partially to remove some terms that are used very seldom but, more importantly, to provide a means for removing words of erratic spelling, e.g., due to spelling errors. To reduce the possible number of candidates, the specification of "at least two" may be increased to "at least three", or even more documents. It essentially becomes a tradeoff between computing time and computing resources such that the number can be chosen according to the applications being sought. In special situations when the database is very small, as in the example discussed hereinafter, the restriction may be removed, allowing a word or phrase even it if appears only once in the database.

To effectively deal with morphological term variants of natural language, a stemming process is essential not only to reduce the size of indexing files but also to improve the efficiency of information retrieval (IR). A stemming algorithm needs be implemented before the term index can be set up. While many stemming algorithms are available currently, there is relatively little difference between them as far as the final retrieval performance is concerned. A preferred embodiment of the present invention uses an Affix Removal Stemmer by Porter, named Porter algorithm (M. F. Porter, "An algorithm for suffix stripping", Program, vol. 14, no. 3, pp. 130-137, 1980).

Suppose the terms that appear in the documents are selected and listed as $t_1, t_2, \ldots, t_m$. Each document in the collection is preprocessed and assigned with a document vector as $(a_1, a_2, \ldots, a_m)$, where $a_i = f_i \times g_i$, where $f_i$ is the number of times the term $t_i$ appears in an expression of the document, and $g_i$ is a global weight of all the documents, which is a parameter indicating the importance of the term in representing the documents. Local weights may be either raw occurrence counts, Boolean, or logarithm of occurrence count. Global weighting may be no weighting (uniform), domain specific, or entropy weighting. For example, $$f_i = \log(1 + O_i) \text{ and } g_i = 1 - \frac{1}{\log N} \sum_{j=1}^{N} p_{ij} \log(p_{ij}),$$

where $$p_{ij} = \frac{O_{ij}}{d_i},$$

$O_i$ is the number of term $t_i$ that appears in the document, $d_i$ is the total number of times that the term $t_i$ appears in the collection, $O_{ij}$ is the number of times that the term $t_i$ appears in the document j, N is the number of documents in collection. Notice that $p_{1j} \log(p_{1j})$ is defined to be 0, if $p_{1j}=0$. The document vector is normalized as $(b_1, b_2, \ldots, b_m)$ by the following formula:

$$b_i = a_i \bigg/ \sqrt{\sum_{j=1}^{m} a_j^2}.$$

Whether or not a summary obtained by any of various summarization techniques or a pre-assigned summary, or a query associated with the document are used, the document is always associated with several other document vectors while regarding the summary of query as a document.

A Differential Document Vector is defined as $I_1 - I_2$ where $I_1$ and $I_2$ are normalized document vectors satisfying some criteria.

An Exterior Differential Document Vector is defined as the Differential Document Vector $I = I_1 - I_2$, where $I_1$ and $I_2$ are two normalized document vectors of any two different documents.

An Interior Differential Document Vector is the Differential Document Vector defined as $I = I_1 - I_2$, where $I_1$ and $I_2$ are two different normalized document vectors of the same document. The different document vectors of the same documents may be taken from parts of documents, or may be produced by different schemes of summaries, or from the quarries.

The Exterior Differential Term-Document Matrix is defined as a matrix, each column of which is set to be an Exterior Differential Document Vector.

The Interior Differential Term-Document Matrix is defined as a matrix, each column of which comprises an Interior Differential Document Vector.

Details of a General Model

Any differential term-document matrix, say, m-by-n matrix D of rank $r \leq q = \min(m, n)$, can be decomposed into a product of three matrices:

$D = USV^T$, such that U and V are an m-by-q and q-by-n unitary matrices respectively, and the first r columns of U and V are the eigenvectors of $DD^T$ and $D^T D$ respectively. $S = \text{diag}(\delta_1, \delta_2, \ldots, \delta_q)$, where $\delta_i$ are nonnegative square roots of eigen values of $DD^T$, $\delta_i > 0$ for $i \leq r$ and $\delta_i = 0$ for $i > r$.

By convention, the diagonal elements of S are sorted in a decreasing order of magnitude. To obtain a new reduced matrix $S_k$, the k-by-k leftmost-upper corner matrix (k<r) of S is kept and other terms are deleted; similarly the two new matrices $U_k$ and $V_k$ are obtained by keeping the leftmost k columns of U and V. The product of $U_k$, $S_k$ and $V_k^T$ provides a matrix $D_k$ which is approximately equal to D.

An appropriate value of k to be selected depends on the type of applications. Generally $k \geq 100$ for $1000 \leq n \leq 3000$, and the corresponding k is normally smaller for the interior differential term-document matrix than that for the exterior differential term-document matrix.

Each of differential document vector q could find a projection on the k dimensional fact space, being called differential latent semantic space, spanned by the k columns of $U_k$. The projection can easily be obtained by $U_k^T q$. Note that, the mean $\bar{x}$ of the exterior-(interior-)differential document vectors is approximately 0. Thus, $$\Sigma = \frac{1}{n} DD^T,$$

where $\Sigma$ is the covariance of the distribution computed from the training set. Assuming that the differential document vectors formed follow a high-dimensional Gaussian distribution, the likelihood of any differential document vector x will be given by $$P(x|D) = \frac{\exp\left[-\frac{1}{2}d(x)\right]}{(2\pi)^{n/2}|\Sigma|^{1/2}},$$

where $d(x) = x^T \Sigma^{-1} x$.
Since $\delta_i^2$ are eigenvalues of $DD^T$, we have $S^2 = U^T DD^T U$, and thus $$d(x) = nx^T(DD^T)^{-1}x = nx^T US^{-2} U^T x = ny^t S^{-2} y,$$

where $y = U^T x = (y_1, y_2, \ldots, y_n)^T$.
Because S is a diagonal matrix, $d(x) = n\Sigma'_{i=1}{}^r y_i^2 / \delta_i^2$.
It is convenient to estimate it as $$\hat{d}(x) = n\left(\sum_{i=1}^{k} y_i^2 / \delta_i^2 + \frac{1}{\rho} \sum_{i=k+1}^{r} y_i^2\right).$$

where $$\rho = \frac{1}{r-k} \sum_{i=k+1}^{r} \delta_i^2.$$

In practice, $\delta_i$ (i>k) could be estimated by fitting a function (say, 1/i) to the available $\delta_i$ (i≤k), or we could let $\rho = \delta_{k+1}^2/2$ since it is only necessary to compare the relative probability. Because the columns of U are orthonormal vectors, $\Sigma'_{i=k+a}{}^r y_i^2$ may be estimated by $\|x\|^2 - \Sigma_{i=1}^{k} y_i^2$. Thus, the likelihood function P(x|D) may be estimated by $$\hat{P}(x|D) = \frac{n^{1/2}\exp\left(-\frac{n}{2}\sum_{i=1}^{k}\frac{y_i^2}{\delta_i^2}\right)\cdot\exp\left(-\frac{n\varepsilon^2(x)}{2\rho}\right)}{(2\pi)^{n/2}\prod_{i=1}^{k}\delta_i \cdot \rho^{(r-k)/2}}, \quad (1)$$

where $$y = U_k^T x, \ \varepsilon^2(x) = \|x\|^2 - \sum_{i=1}^{k} y_i^2, \ \rho = \frac{1}{r-k} \sum_{i=k+1}^{r} \delta_i^2,$$

r is the rank of matrix D. In practical cases, $\rho$ may be chosen as $\delta_{k+a}^2/2$, and r be n.
Note that, in equation (1), the term $$\sum_{i=1}^{k} \frac{y_i^2}{\delta_i^2}$$

describes the projection x onto the differential latent semantic space, while $\varepsilon(x)$ approximates the projection of x on the orthogonal space of the differential latent semantic space.

Algorithm

Figure 1:
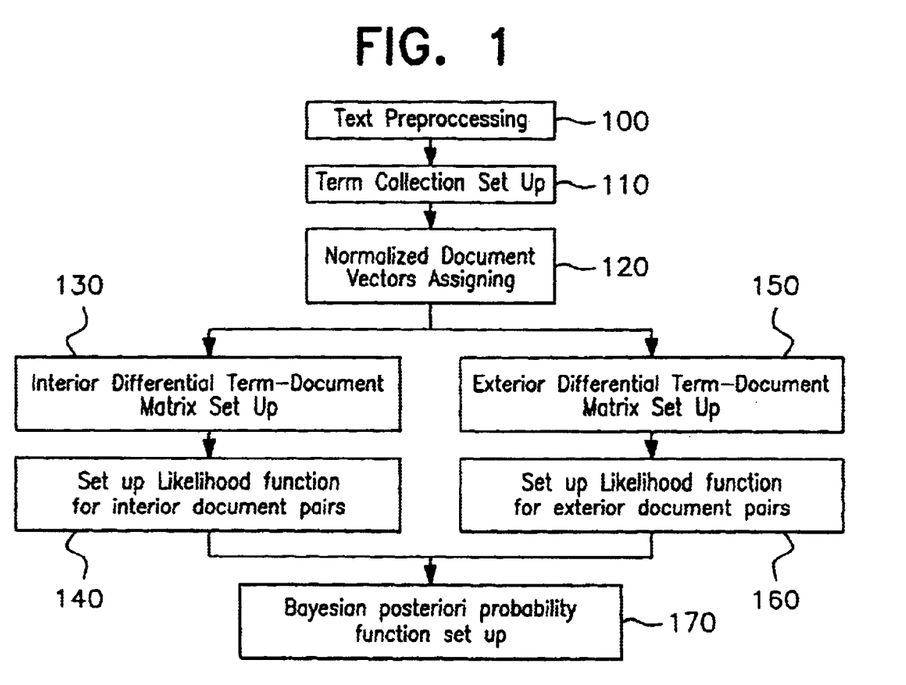
FIG. 1 is a flowchart summarizing the process of setting up of the information retrieval system, in accordance with the present invention.

The process for setting up the retrieval system in accordance with the present invention is summarized in FIG. 1. The method begins with text preprocessing, step 100, which includes identification of word and noun phrases, as well as stop words. The method then proceeds with system term construction, step 110, which includes setting up the term list as well as the global weights. The document vectors of all the collected documents are then set up and normalized, step 120. Next, an interior differential term-document matrix $D_I^{m \times n_i}$ is constructed, step 130, such that each of its columns is an interior differential document vector. Using SVD algorithm, $D_I$ is decomposed such that $D_I = USV^T$, then with a proper $k_1$, the $D_{I,k_1} = U_{k_1} S_{k_1} V_{k_1}^T$ is defined to approximate $D_I$. In step 140, the likelihood function is defined, $$P(x|D_I) = \frac{n_1^{1/2}\exp\left(-\frac{n_1}{2}\sum_{i=1}^{k_1}\frac{y_i^2}{\delta_i^2}\right)\cdot\exp\left(-\frac{n_1\varepsilon^2(x)}{2\rho_1}\right)}{(2\pi)^{n_1/2}\prod_{i=1}^{k_1}\delta_i \cdot \rho_1^{(r_1-k_1)/2}},$$

where $$y = U_{k_1}^T x, \ \varepsilon^2(x) = \|x\|^2 - \sum_{i=1}^{k_1} y_i^2, \ \rho_1 = \frac{1}{r_1-k_1} \sum_{i=k_1+1}^{r_1} \delta_i^2,$$

$r_1$ is the rank of matrix $D_I$. In practical cases, $\rho_1$ may be chosen as $\delta_{k_1+1}^2/2$, and $r_1$ be $n_1$. An exterior differential term-document matrix $D_E^{m \times n_2}$, is then constructed, step 150, such that each of its columns is an exterior differential document vector. Using SVD algorithm, $D_E$ is decomposed such that $D_E = USV^T$, then with a proper value of $k_2$, the $D_{E,k_2} = U_{k_2} S_{k_2} V_{k_2}^T$ is defined to approximate $D_E$. In step 160, the likelihood function is defined, $$P(x|D_E) = \frac{n_1^{1/2}\exp\left(-\frac{n_2}{2}\sum_{i=1}^{k_2}\frac{y_i^2}{\delta_i^2}\right)\cdot\exp\left(-\frac{n_2\varepsilon^2(x)}{2\rho_2}\right)}{(2\pi)^{n_2/2}\prod_{i=1}^{k_2}\delta_i \cdot \rho_2^{(r_2-k_2)/2}},$$

where $$y = U_{k_2}^T x, \ \varepsilon^2(x) = \|x\|^2 - \sum_{i=1}^{k_2} y_i^2, \ \rho_2 = \frac{1}{r_2-k_2} \sum_{i=k_2+1}^{r_2} \delta_i^2,$$

$r_2$ is the rank of matrix $D_E$. In practical cases, $\rho_2$ may be chosen as $\delta_{k_2+1}^2/2$, and $r_2$ be $n_2$.
Finally, in step 170 the posteriori function is defined, $$P(D_I, x) = \frac{P(x|D_I)P(D_I)}{P(x|D_I)P(D_I) + P(x|D_E)P(D_E)},$$

where $P(D_I)$ is set to be an average number of recalls divided by the number of documents in the data base and $P(D_E)$ is set to be $1 - P(D_I)$.

Online Document Search

Figure 2:
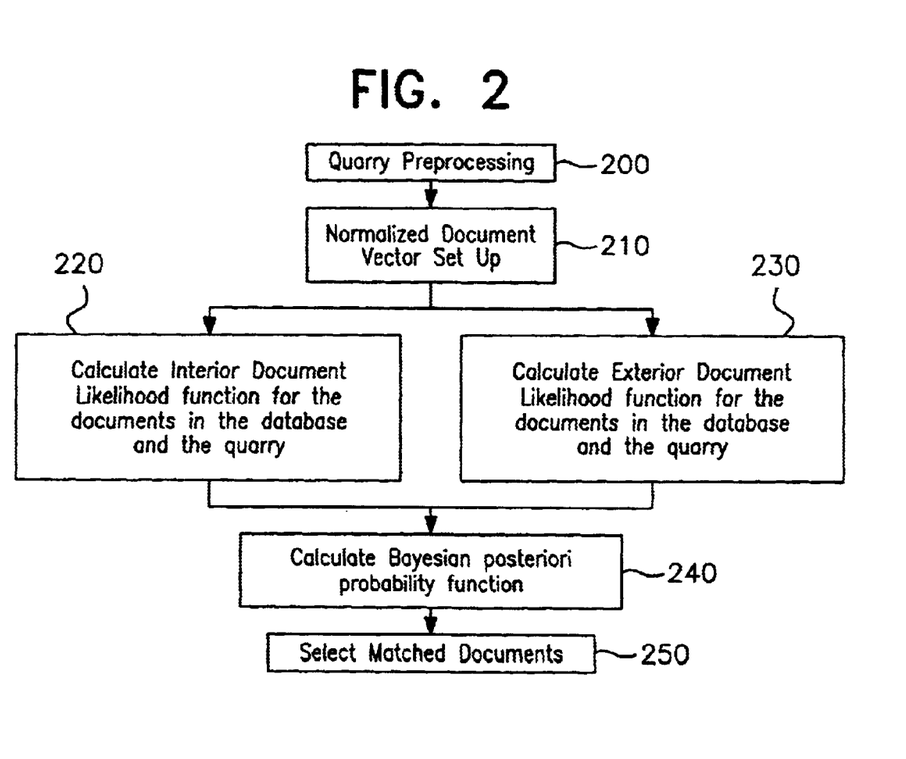
FIG. 2 is a flowchart describing how the on-line document retrieval is implemented, in accordance with the present invention.

The retrieval process in accordance with the present invention is set forth in FIG. 2. A query is treated as a document. During query preprocessing, step 200, a document vector is set up by generating the terms as well as their frequency of occurrence, and thus a normalized document vector is obtained for the query. Given the query, a differential document vector x is constructed, step 210. The interior document likelihood function $P(x|D_I)$ is calculated for the document at step 220, and the exterior document likelihood function $P(x|D_E)$ is calculated for the document at step 230. The method proceeds with calculation of the Bayesian posteriori probability function $P(D_I|x)$, step 240. Finally, in step 250, documents may be selected such that $P(D_I|x)$ exceeds a given threshold (say, 0.5). Alternatively, N best documents with largest $P(D_I|x)$ may be chosen, with those values of $P(D_I|x)$ shown as the scores to rank the match.

For each document in the database, the procedures in steps 210, 220, 230, 240 and 250 are processed.

The system of the present invention can also be used for cross language retrieval when there is a large set of cross language documents as well as a set of summaries as the training set.

As already noted in the "Summary of the Invention", each document needs to be represented by two or more document vectors. The document vectors can be constructed off line, of course, as long as their summaries are available. Otherwise, some summarization method and/or software should be used to obtain summaries for each document. It is important to note, however, that while the quality of the summarization is important for the present IR system, the summarization document constructed need not be grammatically correct.

AN EXAMPLE

The power of the current method may be demonstrated by the following example.

Suppose we have four documents named A, B, C, D at hand. And $A_1$, $A_2$ are the abstracts of A obtained by different methods; similarly, $B_1$, $B_2$, $C_1$, $C_2$, and $D_1$, $D_2$, are the abstracts of B, C and D as obtained by different methods respectively. Suppose that $A_1$, $A_2$, $B_1$, $B_2$, $C_1$, $C_2$, $D_1$ and $D_2$ are given as follows:

$A_1$: We were successful in our research on the new alloys.

$A_2$: In studying the novel alloy, they attained success.

$B_1$: Galileo's research influenced the physical sciences in a big way.

$B_2$: The physical research was impacted enormously by Galileo's theories.

$C_1$: Performance was raised as a result of many improvements.

$C_2$: By making a large number of improvements, its performance was enhanced.

$D_1$: The objective of this project is to improve performance.

$D_2$: To improve performance is this project's target.

Since we have only four documents in the database in this example representing the documents A, B, C, D respectively, let us arbitrarily save $A_1$, $B_2$, $C_1$ and $D_2$ in the database. As already mentioned above, the use of different stemming algorithms differs very little for IR performance. After removing the stop words, Porter's stemming algorithm gives the following stems here: attain, aloi, enhanc, enorm, Galileo, impact, improv, influence novel, object, perform, physic, project, rais, research, result, science, studio success, target, theori.

Now, each document is associated with two document vectors as shown in Table 1 in which each column corresponds to a document vector.

TABLE 1

The document vectors of the documents

|          | $A_1$ | $A_2$ | $B_1$ | $B_2$ | $C_1$ | $C_2$ | $D_1$ | $D_2$ |
|----------|-------|-------|-------|-------|-------|-------|-------|-------|
| attain   | 0 | 1 | 0 | 0 | 0 | 0 | 0 | 0 |
| alloi    | 1 | 1 | 0 | 0 | 0 | 0 | 0 | 0 |
| enhanc   | 0 | 0 | 0 | 0 | 0 | 1 | 0 | 0 |
| enorm    | 0 | 0 | 0 | 1 | 0 | 0 | 0 | 0 |
| Galileo  | 0 | 0 | 1 | 1 | 0 | 0 | 0 | 0 |
| impact   | 0 | 0 | 0 | 1 | 0 | 0 | 0 | 0 |
| improv   | 0 | 0 | 0 | 0 | 1 | 1 | 1 | 1 |
| influence| 0 | 0 | 1 | 0 | 0 | 0 | 0 | 0 |
| novel    | 0 | 1 | 0 | 0 | 0 | 0 | 0 | 0 |
| object   | 0 | 0 | 0 | 0 | 0 | 0 | 1 | 0 |
| perform  | 0 | 0 | 0 | 0 | 1 | 1 | 1 | 1 |
| physic   | 0 | 0 | 1 | 1 | 0 | 0 | 0 | 0 |
| project  | 0 | 0 | 0 | 0 | 0 | 0 | 1 | 1 |
| rais     | 0 | 0 | 0 | 0 | 1 | 0 | 0 | 0 |
| research | 1 | 0 | 1 | 1 | 0 | 0 | 0 | 0 |
| result   | 0 | 0 | 0 | 0 | 1 | 0 | 0 | 0 |
| science  | 0 | 0 | 1 | 0 | 0 | 0 | 0 | 0 |
| studi    | 0 | 1 | 0 | 0 | 0 | 0 | 0 | 0 |
| success  | 1 | 1 | 0 | 0 | 0 | 0 | 0 | 0 |
| target   | 0 | 0 | 0 | 0 | 0 | 0 | 0 | 1 |
| theori   | 0 | 0 | 0 | 1 | 0 | 0 | 0 | 0 |

We could further normalize each document vector (column) as shown in Table 2.

TABLE 2

The normalized document vectors of the documents

|          | $A_1$ | $A_2$ | $B_1$ | $B_2$ | $C_1$ | $C_2$ | $D_1$ | $D_2$ |
|----------|-------|-------|-------|-------|-------|-------|-------|-------|
| attain   | 0 | 0.447213595 | 0 | 0 | 0 | 0 | 0 | 0 |
| alloi    | 0.577350269 | 0.447213595 | 0 | 0 | 0 | 0 | 0 | 0 |
| enhanc   | 0 | 0 | 0 | 0 | 0 | 0.577350269 | 0 | 0 |
| enorm    | 0 | 0 | 0 | 0.40824829 | 0 | 0 | 0 | 0 |
| Galileo  | 0 | 0 | 0.447213595 | 0.40824829 | 0 | 0 | 0 | 0 |
| impact   | 0 | 0 | 0 | 0.40824829 | 0 | 0 | 0 | 0 |
| improv   | 0 | 0 | 0 | 0 | 0.5 | 0.577350269 | 0.5 | 0.5 |
| influenc | 0 | 0 | 0.447213595 | 0 | 0 | 0 | 0 | 0 |
| novel    | 0 | 0.447213595 | 0 | 0 | 0 | 0 | 0 | 0 |
| object   | 0 | 0 | 0 | 0 | 0 | 0 | 0.5 | 0 |
| perform  | 0 | 0 | 0 | 0 | 0.5 | 0.577350269 | 0.5 | 0.5 |
| physic   | 0 | 0 | 0.447213595 | 0.40824829 | 0 | 0 | 0 | 0 |
| project  | 0 | 0 | 0 | 0 | 0 | 0 | 0.5 | 0.5 |
| rais     | 0 | 0 | 0 | 0 | 0.5 | 0 | 0 | 0 |
| research | 0.577350269 | 0 | 0.447213595 | 0.40824829 | 0 | 0 | 0 | 0 |
| result   | 0 | 0 | 0 | 0 | 0.5 | 0 | 0 | 0 |

TABLE 2-continued

The normalized document vectors of the documents

|  | $A_1$ | $A_2$ | $B_1$ | $B_2$ | $C_1$ | $C_2$ | $D_1$ | $D_2$ |
|---|---|---|---|---|---|---|---|---|
| science | 0 | 0 | 0.447213595 | 0 | 0 | 0 | 0 | 0 |
| studi | 0 | 0.447213595 | 0 | 0 | 0 | 0 | 0 | 0 |
| success | 0.577350269 | 0.447213595 | 0 | 0 | 0 | 0 | 0 | 0 |
| target | 0 | 0 | 0 | 0 | 0 | 0 | 0 | 0.5 |
| theori | 0 | 0 | 0 | 0.40824829 | 0 | 0 | 0 | 0 |

We then construct differential term-document matrix $D_I^{m \times n_1}$ as Table 3 (here m=21, $n_1$=4).

TABLE 3

Interior Differential Term-Document Matrix

|  | $A_1 - A_2$ | $B_1 - B_2$ | $C_1 - C_2$ | $D_1 - D_2$ |
|---|---|---|---|---|
| attain | −0.447213595 | 0 | 0 | 0 |
| alloi | 0.130136674 | 0 | 0 | 0 |
| enhanc | 0 | 0 | −0.577350269 | 0 |
| enorm | 0 | −0.40824829 | 0 | 0 |
| Galileo | 0 | 0.038965305 | 0 | 0 |
| impact | 0 | −0.40824829 | 0 | 0 |
| improv | 0 | 0 | −0.077350269 | 0 |
| influenc | 0 | 0.447213595 | 0 | 0 |
| novel | −0.447213595 | 0 | 0 | 0 |
| object | 0 | 0 | 0 | 0.5 |
| perform | 0 | 0 | −0.077350269 | 0 |
| physic | 0 | 0.038965305 | 0 | 0 |
| project | 0 | 0 | 0 | 0 |
| rais | 0 | 0 | 0.5 | 0 |
| research | 0.577350269 | 0.038965305 | 0 | 0 |
| result | 0 | 0 | 0.5 | 0 |
| science | 0 | 0.447213595 | 0 | 0 |
| studi | −0.447213595 | 0 | 0 | 0 |
| success | 0.130136674 | 0 | 0 | 0 |
| target | 0 | 0 | 0 | −0.5 |
| theori | 0 | −0.40824829 | 0 | 0 |

By decomposing this $D_I$ by an SVD algorithm, we have $D_I = USV^T$, where $$U = \begin{pmatrix} -0.43125 & 0.144655 & 0 & 0 \\ 0.125491 & -0.0420937 & 0 & 0 \\ 0 & 0 & -0.627963 & 0 \\ -0.126717 & -0.410246 & 0 & 0 \\ 0.0120945 & 0.039156 & 0 & 0 \\ -0.126717 & -0.410246 & 0 & 0 \\ 0 & 0 & -0.0841311 & 0 \\ 0.138812 & 0.449402 & 0 & 0 \\ -0.43125 & 0.144655 & 0 & 0 \\ 0 & 0 & 0 & -0.707107 \\ 0 & 0 & -0.0841311 & 0 \\ 0.0120945 & 0.039156 & 0 & 0 \\ 0 & 0 & 0 & 0 \\ 0 & 0 & 0.543832 & 0 \\ 0.568835 & -0.147592 & 0 & 0 \\ 0 & 0 & 0.543832 & 0 \\ 0.138812 & 0.449402 & 0 & 0 \\ -0.43125 & 0.144655 & 0 & 0 \\ 0.125491 & -0.0420937 & 0 & 0 \\ 0 & 0 & 0 & 0.707107 \\ -0.126717 & -0.410246 & 0 & 0 \end{pmatrix},$$

$$S = diag(0.98714, 0.947266, 0.919402, 0.707107),$$

$$V = \begin{pmatrix} 0.951903 & -0.306401 & 0 & 0 \\ 0.306401 & 0.951903 & 0 & 0 \\ 0 & 0 & 1 & 0 \\ 0 & 0 & 0 & -1 \end{pmatrix}.$$

By choosing $k_1$=3, we have $$U_{k_1} = \begin{pmatrix} -0.43125 & 0.144655 & 0 \\ 0.125491 & -0.0420937 & 0 \\ 0 & 0 & -0.627963 \\ -0.126717 & -0.410246 & 0 \\ 0.0120945 & 0.039156 & 0 \\ -0.126717 & -0.410246 & 0 \\ 0 & 0 & -0.0841311 \\ 0.138812 & 0.449402 & 0 \\ -0.43125 & 0.144655 & 0 \\ 0 & 0 & 0 \\ 0 & 0 & -0.0841311 \\ 0.0120945 & 0.039156 & 0 \\ 0 & 0 & 0 \\ 0 & 0 & 0.543832 \\ 0.568835 & -0.147592 & 0 \\ 0 & 0 & 0.543832 \\ 0.138812 & 0.449402 & 0 \\ -0.43125 & 0.144655 & 0 \\ 0.125491 & -0.0420937 & 0 \\ 0 & 0 & 0 \\ -0.126717 & -0.410246 & 0 \end{pmatrix}.$$

Estimating the $r_1 = n_1 = 4$, we have $$\rho_1 = \frac{1}{r_1 - k_1} \sum_{i=k_1+1}^{r} \delta_i^2 = \frac{1}{4-3}(0.707107^2) = 0.5.$$

So, the function $P(x|D_I)$ now becomes:

$$P(x|D_I) = \frac{4^{1/2}\exp\left(-\frac{4}{2}\left(\frac{y_1^2}{0.98714^2} + \frac{y_2^2}{0.947266^2} + \frac{y_3^2}{0.919402^2}\right)\right) \cdot \exp\left(-\frac{4\varepsilon^2(x)}{2\times 0.5}\right)}{(2\pi)^{4/2}\times 0.98714\times 0.947266\times 0.919402\times 0.5^{(4-3)/2}} \quad (2)$$

$$= 0.083335295\times \exp(-2*(y_1^2/0.9744453796 + y_2^2/0.897312874756 + y_3^2/0.845300037604))\times$$
$$\exp(-4\varepsilon^2(x)),$$

where $y = U_{k_1}^T x, \varepsilon^2(x) = \|x\|^2 = (y_1^2 + y_2^2 + y_3^2)$.

By choosing $n_2=4$, we then construct the exterior differential term-document matrix $D_E^{m\times n_2}$, to obtain the matrix of Table 4. We have a different result if we use a different combination of $n_2$.

TABLE 4

Exterior Differential Term-Document Matrix

| | $A_1 - B_1$ | $B_2 - C_2$ | $C_1 - D_2$ | $D_1 - A_2$ |
|---|---|---|---|---|
| Attain | 0 | 0 | 0 | −0.447213595 |
| Alloi | 0.577350269 | 0 | 0 | −0.447213595 |
| Enhanc | 0 | −0.577350269 | 0 | 0 |
| Enorm | 0 | 0.40824829 | 0 | 0 |
| Galileo | −0.447213595 | 0.40824829 | 0 | 0 |
| impact | 0 | 0.40824829 | 0 | 0 |
| improv | 0 | −0.577350269 | 0 | 0.5 |
| influenc | −0.447213595 | 0 | 0 | 0 |
| novel | 0 | 0 | 0 | −0.447213595 |
| object | 0 | 0 | 0 | 0.5 |
| perform | 0 | −0.577350269 | 0 | 0.5 |
| physic | −0.447213595 | 0.40824829 | 0 | 0 |
| project | 0 | 0 | −0.5 | 0.5 |
| rais | 0 | 0 | 0.5 | 0 |
| research | 0.130136674 | 0.40824829 | 0 | 0 |
| result | 0 | 0 | 0.5 | 0 |
| science | −0.447213595 | 0 | 0 | 0 |
| studi | 0 | 0 | 0 | −0.447213595 |
| success | 0.577350269 | 0 | 0 | −0.447213595 |
| target | 0 | 0 | −0.5 | 0 |
| theori | 0 | 0.40824829 | 0 | 0 |

Decomposing this $D_E$ by SVD algorithm, we have $D_E = USV^T$, where:

$$U = \begin{pmatrix} 0.209812 & 0.107201 & 0.0888488 & -0.262009 \\ 0.272505 & 0.386168 & -0.167306 & 0.090479 \\ -0.218995 & 0.257445 & 0.155889 & -0.24791 \\ 0.154853 & -0.182041 & -0.11023 & 0.175299 \\ 0.106291 & -0.398128 & 0.0881866 & -0.0977373 \\ 0.154853 & -0.182041 & -0.11023 & 0.175299 \\ -0.453572 & 0.13759 & 0.0565533 & 0.045025 \\ -0.0485619 & -0.216087 & 0.198417 & -0.273036 \\ 0.209812 & 0.107201 & 0.0888488 & -0.262009 \\ -0.234577 & -0.119854 & -0.099336 & 0.292935 \\ -0.453572 & 0.13759 & 0.0565533 & 0.045025 \\ 0.106291 & -0.398128 & 0.0881866 & -0.0977373 \\ -0.270671 & -0.149009 & -0.49682 & -0.0235622 \\ 0.0360937 & 0.029155 & 0.397484 & 0.316497 \\ 0.168984 & -0.119161 & -0.167969 & 0.254751 \\ 0.0360937 & 0.029155 & 0.397484 & 0.316497 \\ -0.0485619 & -0.216087 & 0.198417 & -0.273036 \\ 0.209812 & 0.107201 & 0.0888488 & -0.262009 \\ 0.272505 & 0.386168 & -0.167306 & 0.090479 \\ -0.0360937 & -0.029155 & -0.397484 & -0.316497 \\ 0.154853 & -0.182041 & -0.11023 & 0.175299 \end{pmatrix},$$

$S = diag(1.62012, 1.42399, 1.03077, 0.876705)$, $$V = \begin{pmatrix} 0.175925 & 0.688048 & -0.457324 & 0.535252 \\ 0.614528 & -0.634965 & -0.278315 & 0.376451 \\ 0.116952 & 0.0830325 & 0.819426 & 0.554949 \\ -0.760084 & -0.341342 & -0.204784 & 0.513635 \end{pmatrix},$$

For $k_2=2$, we have $$U_{k_2} = \begin{pmatrix} 0.209812 & 0.107201 \\ 0.272505 & 0.386168 \\ -0.218995 & 0.257445 \\ 0.154853 & -0.182041 \\ 0.106291 & -0.398128 \\ 0.154853 & -0.182041 \\ -0.453572 & 0.13759 \\ -0.0485619 & -0.216087 \\ 0.209812 & 0.107201 \\ -0.234577 & -0.119854 \\ -0.453572 & 0.13759 \\ 0.106291 & -0.398128 \\ -0.270671 & -0.149009 \\ 0.0360937 & 0.029155 \\ 0.168984 & -0.119161 \\ 0.0360937 & 0.029155 \\ -0.0485619 & -0.216087 \\ 0.209812 & 0.107201 \\ 0.272505 & 0.386168 \\ -0.0360937 & -0.029155 \\ 0.154853 & -0.182041 \end{pmatrix},$$

Estimating that $r_2$ $n_2$=4, then we have $$\rho_2 = \frac{1}{r_2 - k_2} \sum_{i=k_2+1}^{r} \delta_i^2 = \frac{1}{4-2}(1.03077^2 + 0.876705^2) = 0.91554922.$$

So, the function $P(x|D_E)$ now becomes:

$$P(x|D_E) = \frac{4^{1/2}\exp\left(-\frac{4}{2}\left(\frac{y_1^2}{1.62012^2} + \frac{y_2^2}{1.42399^2}\right)\right) \cdot \exp\left(-\frac{4\epsilon^2(x)}{2 \times 0.91554922}\right)}{(2\pi)^{4/2} \times 1.62012 \times 1.42399 \times 0.91554922^{(4-2)/2}} \quad (3)$$

$$= 0.023984708 \times \exp(-2*(y_1^2/2.6247888144 + y_2^2/2.0277475201)) \times \exp(-2.184481135 81\epsilon^2(x)),$$

where $y=U_{k_2}^T x, \epsilon^2(x)=\|x\|^2-(y_1^2+y_2^2)$.

Suppose the average number of recalls to be 1. Then $P(D_I, x)$ becomes $$P(D_I|x) = \frac{0.25 P(x|D_I)}{0.25 P(x|D_I) + 0.75 P(x|D_E)}. \quad (4)$$

To determine a final candidate for recall to a query q, we could choose the document t having a highest value of $P(D_I|t-q)$ exceeding the threshold value. Or we could choose the best N documents t with largest $P(D_I|t-q)$ as the final candidates to the query. In this example, we will choose the only document t with largest $P(D_I|t-q)$ as the candidate to an arbitrary query q.

Now, suppose we want to search the document (documents) according to the query:

"The result is influenced by the study of science".

The normalized document vector of this query is:

q=(0, 0, 0, 0, 0, 0, 0, 0. 5, 0, 0, 0, 0, 0, 0, 0, 0. 5, 0. 5, 0. 5, 0, 0, 0)$^T$.

For all the documents $A_1$, $B_2$, $C_1$, and $D_2$, the differential document vectors are obtained with the query. The results can be shown as Table 5, where each column corresponds to one vector.

We need to calculate the $D(x|D_I)$, $P(x|D_E)$ and $P(D_I|x)$ of each vector ($A_1$-q, $B_2$-q, $C_1$-q and $D_2$-q) in Table 5, according to the algorithm. To calculate $P(x|D_1)$, the following steps are undertaken:

1. With equation $y=U_{k_1}^T x$, obtain the coordinates of the projects of vectors $A_1$-q, $B_2$-q, $C_1$-q and $D_2$-q in the interior differential latent semantic space, as shown in Table 6. According to equation (2), we have $P(A_1-q|D_I)=0.000121753$, $P(B_2-q|D_I)=0.000236386$, $P(C_1-q|D_I)=0.000358469$ and $P(D_2-q|D_I)=0.0000563377$.

2. With equation $y=U_{k_2}^T x$, obtain the coordinates of the projects of vectors $A_1$-q, $B_2$-q, $C_1$-q and $D_2$-q in the exterior differential latent semantic space, as shown in Table 7. According to equation (3), we have $P(A_1-q|D_E)=0.000497121$, $P(B_2-q|D_E)=0.000429235$, $P(C_1-q|D_E)=0.001438324$ and $P(D_2-q|D_E)=0.000615731$.

3. Then, calculate the $P(D_I|x)$ according to equation (4). $P(D_I|A_1-q)=0.075476859$, $P(D_I|B_2-q)=0.155099594$, $P(D_I|C_1-q)=0.076703526$ and $P(D_I|D_2-q)=0.029596402$ The result is choice of the document: "The physical research was impacted enormously by Galileo's theories." This document is chosen because it has a largest value, implying that it is closest to the query. Surprisingly we note that when we compare the query of "The result is influenced by the study of science" with the document recalled, there is not even one keyword appearing in both the query and the document.

TABLE 5

Differential document vectors of documents and query

| | $A_1$ - q | $B_2$ - q | $C_1$ - q | $D_2$ - q |
|---|---|---|---|---|
| attain | 0 | 0 | 0 | 0 |
| alloi | 0.577350269 | 0 | 0 | 0 |
| enhanc | 0 | 0 | 0 | 0 |
| enorm | 0 | 0.40824829 | 0 | 0 |
| Galileo | 0 | 0.40824829 | 0 | 0 |
| impact | 0 | 0.40824829 | 0 | 0 |
| improv | 0 | 0 | 0.5 | 0.5 |
| influenc | −0.5 | −0.5 | −0.5 | −0.5 |
| novel | 0 | 0 | 0 | 0 |
| object | 0 | 0 | 0 | 0 |
| perform | 0 | 0 | 0.5 | 0.5 |
| physic | 0 | 0.40824829 | 0 | 0 |
| project | 0 | 0 | 0 | 0.5 |
| rais | 0 | 0 | 0.5 | 0 |
| research | 0.577350269 | 0.40824829 | 0 | 0 |
| result | −0.5 | −0.5 | 0 | −0.5 |
| science | −0.5 | −0.5 | −0.5 | −0.5 |
| studi | −0.5 | −0.5 | −0.5 | −0.5 |
| success | 0.577350269 | 0 | 0 | 0 |
| target | 0 | 0 | 0 | 0.5 |
| theori | 0 | 0.40824829 | 0 | 0 |

TABLE 6

Projection in the interior differential latent semantic space

| | $A_1$ - q | $B_2$ - q | $C_1$ - q | $D_2$ - q |
|---|---|---|---|---|
| $y_1$ | 0.550134566 | 0.163718038 | 0.076813 | 0.076813 |
| $y_2$ | −0.655547399 | −1.052459626 | −0.5217295 | −0.5217295 |
| $y_3$ | −0.271916 | −0.271916 | 0.1877849 | −0.3560471 |

TABLE 7

Projection in the exterior differential latent semantic space

| | $A_1$ - q | $B_2$ - q | $C_1$ - q | $D_2$ - q |
|---|---|---|---|---|
| $y_1$ | 0.337833678 | 0.271038135 | −0.49186925 | −0.6813453 |
| $y_2$ | 0.525019762 | −0.448762206 | 0.314654 | 0.196417 |

What is claimed is:

1. A method for setting up an information retrieval system and retrieving text information, comprising the steps of:

preprocessing text including word, noun phrase and stop word identification;

constructing system terms including setting up a term list and global weights;

setting up and normalizing document vectors of all collected documents;

constructing an interior differential term-document matrix $D_I^{m \times n_1}$ such that each column in said interior differential term-document matrix is an interior differential document vector;

decomposing, using SVD algorithm, $D_I$, such that $D_I=USV^T$, then with a proper $k_1$, defining the $D_{I,k_1}=U_{k_1}S_{k_1}V_{k_1}^T$ to approximate $D_I$;

defining an interior document likelihood function, $P(x|D_I)$;

constructing an exterior differential term-document matrix $D_E^{m \times n_1}$, such that each column in said exterior differential term-document matrix is an exterior differential document vector;

decomposing, using SVD algorithm, $D_E$, such that $D_E = USV^T$, then with a proper value of $k_2$, defining the $D_{E,k_2} = U_{k_2} S_{k_2} V_{k_2}^T$ to approximate $D_E$;

defining an exterior document likelihood function, $P(x|D_E)$; and defining a posteriori function $$P(D_I, x) = \frac{P(x|D_I)P(D_I)}{P(x|D_I)P(D_I) + P(x|D_E)P(D_E)},$$

where $P(D_I)$ is set to be an average number of recalls divided by the number of documents in the data base and $P(D_E)$ is set to be $1-P(D_I)$.

2. The method as set forth in claim 1, wherein the interior document likelihood function, $P(x|D_I)$, is, $$P(x|D_I) = \frac{n_1^{1/2} \exp\left(-\frac{n_1}{2} \sum_{i=1}^{k_1} \frac{y_i^2}{\delta_i^2}\right) \cdot \exp\left(-\frac{n_1 \varepsilon^2(x)}{2\rho_1}\right)}{(2\pi)^{n_1/2} \prod_{i=1}^{k_1} \delta_i \cdot \rho_1^{(r_1-k_1)/2}},$$

where $$y = U_{k_1}^T x, \quad \varepsilon^2(x) = \|x\|^2 - \sum_{i=1}^{k_1} y_i^2, \quad \rho_1 = \frac{1}{r_1 - k_1} \sum_{i=k_1+1}^{r_1} \delta_i^2,$$

$r_1$ is a rank of matrix $D_I$.

3. The method as set forth in claim 2, wherein, $\rho_1$ is chosen as $\delta_{k_1+1}^2/2$, and $r_1$ is $n_1$.

4. The method as set forth in claim 1, wherein the exterior document likelihood function, $P(x|D_E)$, is, $$P(x|D_E) = \frac{n_1^{1/2} \exp\left(-\frac{n_2}{2} \sum_{i=1}^{k_2} \frac{y_i^2}{\delta_i^2}\right) \cdot \exp\left(-\frac{n_2 \varepsilon^2(x)}{2\rho_2}\right)}{(2\pi)^{n_2/2} \prod_{i=1}^{k_2} \delta_i \cdot \rho_2^{(r_2-k_2)/2}},$$

where $$y = U_{k_2}^T x, \quad \varepsilon^2(x) = \|x\|^2 - \sum_{i=1}^{k_2} y_i^2, \quad \rho_2 = \frac{1}{r_2 - k_2} \sum_{i=k_2+1}^{r_2} \delta_i^2,$$

$r_2$ is a rank of matrix $D_E$.

5. The method as set forth in claim 4, wherein $\rho_2$ is chosen as $\delta_{k_2+1}^2/2$, and $r_2$ is $n_2$.

6. The method as set forth in claim 1, further comprising the steps of:

setting up a document vector for a query by generating terms as well as frequency of term occurrence, and thereby obtaining a normalized document vector for the query;

given the query, constructing a differential document vector x;

calculating the interior document likelihood function $P(x|D_I)$ and the exterior document likelihood function $P(x|D_E)$ for the document;

calculating the posteriori probability function $P(D_I|x)$; and selecting documents according to one of $P(D_I|x)$ exceeding a given threshold or N best documents with largest $P(D_I|x)$, those values of $P(D_I|x)$ being shown as scores to rank a match.

7. A method for setting up an information retrieval system and retrieving text information, comprising the steps of:

preprocessing text;

constructing system terms;

setting up and normalizing document vectors of all collected documents;

constructing an interior differential term-document matrix $D_I^{m \times n_1}$ such that each column in said interior differential term-document matrix is an interior differential document vector;

decomposing $D_I$, such that $D_I = USV^T$, then with a proper $k_1$, defining the $D_{I,k_1} = U_{k_1} S_{k_1} V_{k_1}^T$ to approximate $D_I$;

defining an interior document likelihood function, $P(x|D_I)$;

constructing an exterior differential term-document matrix $D_E^{m \times n_2}$, such that each column in said exterior differential term-document matrix is an exterior differential document vector;

decomposing $D_E$, such that $D_E = USV^T$, then with a proper value of $k_2$, defining the $D_{E,k_2} = U_{k_2} S_{k_2} V_{k_2}^T$ to approximate $D_E$;

defining an exterior document likelihood function, $P(x|D_E)$;

defining a posteriori function $$P(D_I, x) = \frac{P(x|D_I)P(D_I)}{P(x|D_I)P(D_I) + P(x|D_E)P(D_E)},$$

where $P(D_I)$ is set to be an average number of recalls divided by the number of documents in the data base and $P(D_E)$ is set to be $1-P(D_I)$;

setting up a document vector for a query by generating terms as well as frequency of term occurrence, and thereby obtaining a normalized document vector for the query;

given the query, constructing a differential document vector x;

calculating the interior document likelihood function $P(x|D_I)$ and the exterior document likelihood function $P(x|D_E)$ for the document;

calculating the posteriori probability function $P(D_I|x)$; and selecting documents according to one of $P(D_I|x)$ exceeding a given threshold or N best documents with largest $P(D_I|x)$, those values of $P(D_I|x)$ being shown as scores to rank a match.

8. The method as set forth in claim 7, wherein the interior document likelihood function, $P(x|D_I)$, is, $$P(x|D_I) = \frac{n_1^{1/2} \exp\left(-\frac{n_1}{2} \sum_{i=1}^{k_1} \frac{y_i^2}{\delta_i^2}\right) \cdot \exp\left(\frac{n_1 \varepsilon^2(x)}{2\rho_1}\right)}{(2\pi)^{n_1/2} \prod_{i=1}^{k_1} \delta_i \cdot \rho_i^{(r_1-k_1)/2}},$$

where $$y = U_{k_1}^T x,\ \varepsilon^2(x) = \|x\|^2 - \sum_{i=1}^{k_1} y_i^2,\ \rho_1 = \frac{1}{r_1 - k_1} \sum_{i=k_1+1}^{r_1} \delta_i^2,$$

$r_1$ is a rank of matrix $D_I$.

9. The method as set forth in claim 8, wherein, $\rho_1$ is chosen as $\delta_{k_1+1}^2/2$, and $r_1$ is $n_1$.

10. The method as set forth in claim 7, wherein the exterior document likelihood function, $P(x|D_E)$ is, $$P(x|D_E) = \frac{n_2^{1/2} \exp\left(-\frac{n_2}{2} \sum_{i=1}^{k_2} \frac{y_i^2}{\delta_i^2}\right) \cdot \exp\left(-\frac{n_2 \varepsilon^2(x)}{2\rho_2}\right)}{(2\pi)^{n_2/2} \prod_{i=1}^{k_2} \delta_i \cdot \rho_2^{(r_2-k_2)/2}},$$

where $$y = U_{k_2}^T x,\ \varepsilon^2(x) = \|x\|^2 - \sum_{i=1}^{k_2} y_i^2,\ \rho_2 = \frac{1}{r_2 - k_2} \sum_{i=k_2+1}^{r_2} \delta_i^2,$$

$r_2$ is a rank of matrix $D_E$.

11. The method as set forth in claim 10, wherein $\rho_2$ is chosen as $\delta_{k_2+1}^2/2$, and $r_2$ is $n_2$.

* * * * *